Figure 1:
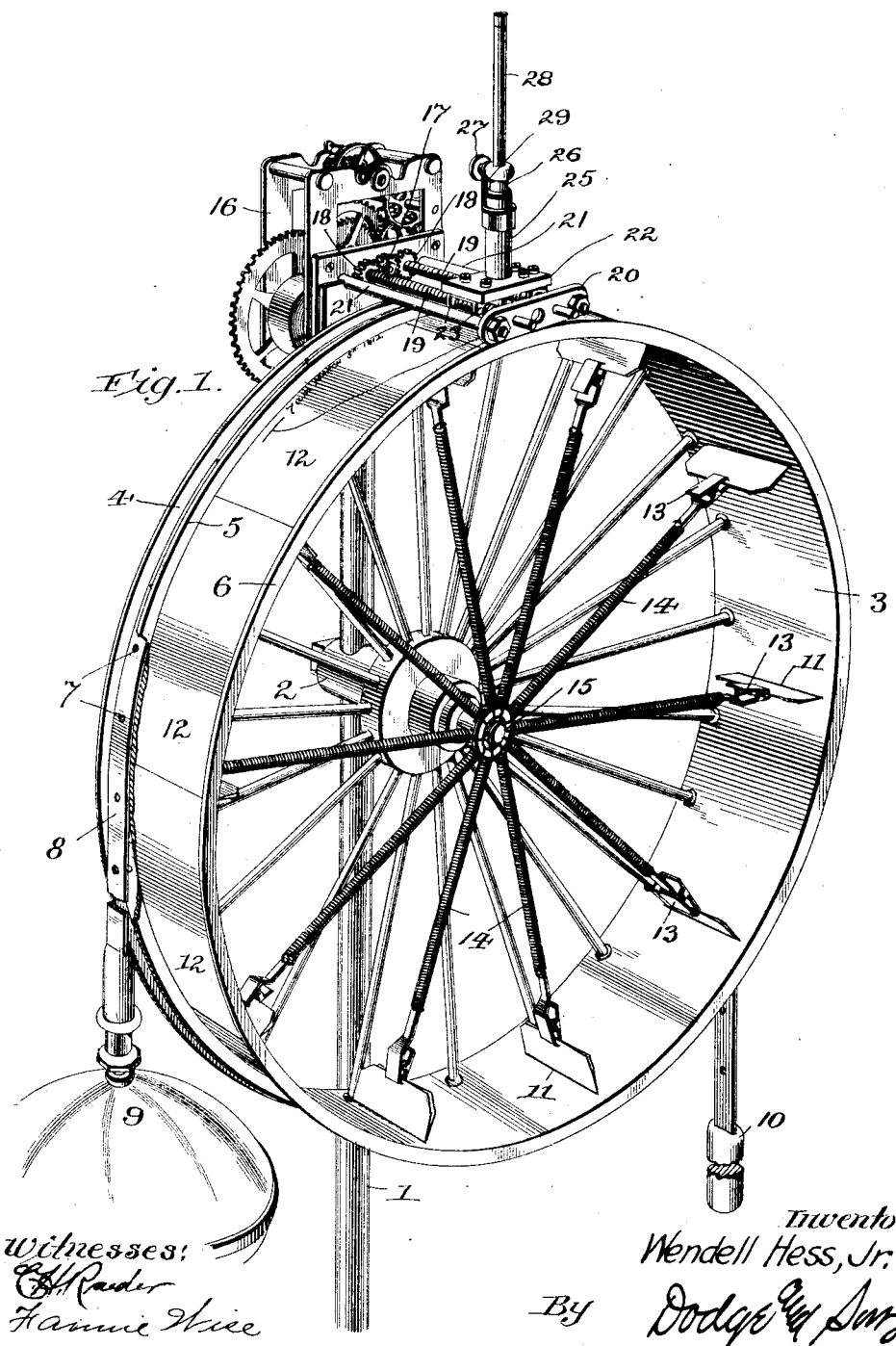

W. HESS, Jr.
RECORDER.
APPLICATION FILED MAY 15, 1912.

1,105,906.

Patented Aug. 4, 1914.

3 SHEETS—SHEET 1.

Witnesses:

Inventor
Wendell Hess, Jr.
By Dodge &c.
Attorneys.

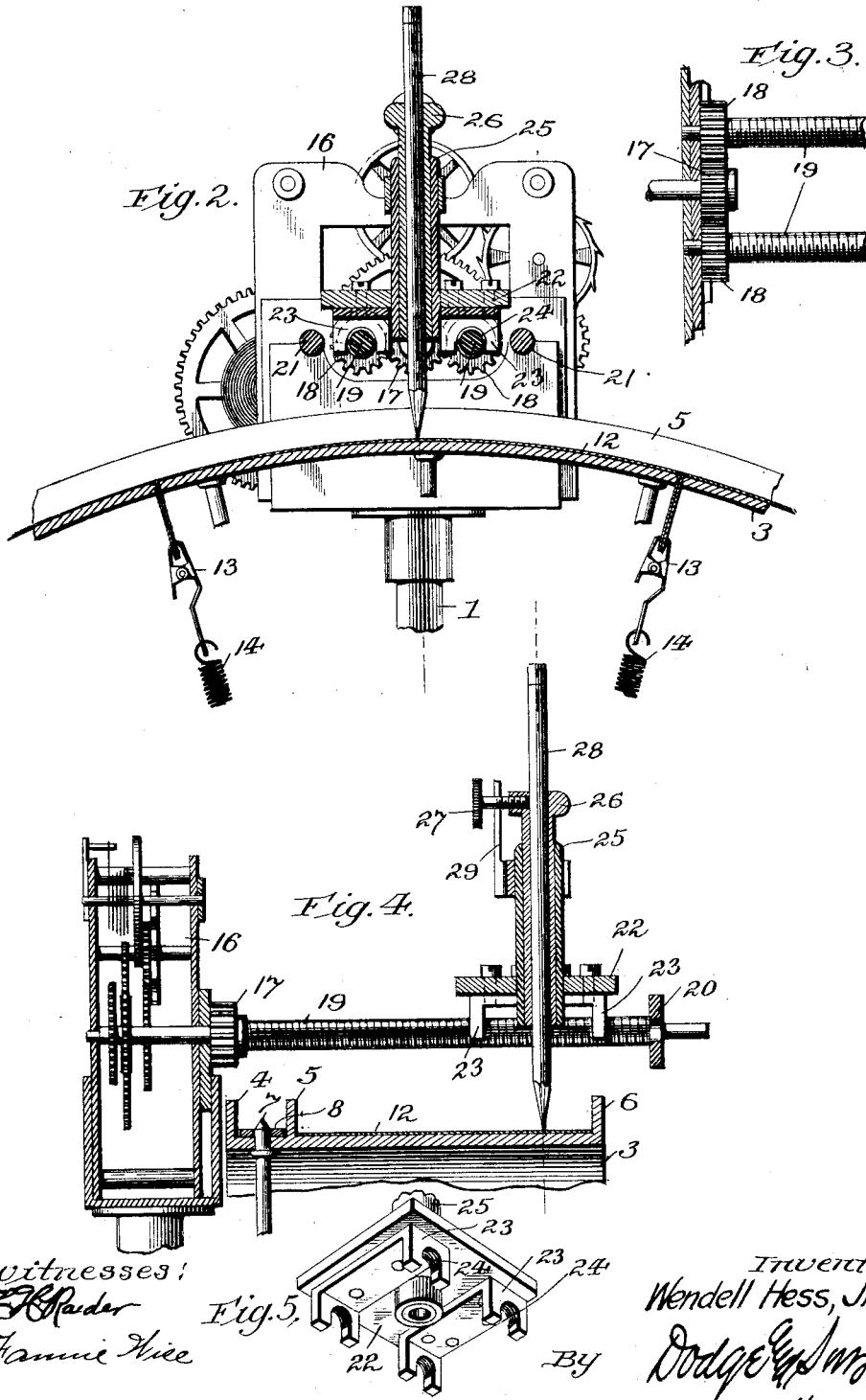

W. HESS, Jr.
RECORDER.
APPLICATION FILED MAY 15, 1912.
1,105,906.
Patented Aug. 4, 1914.
3 SHEETS—SHEET 3.
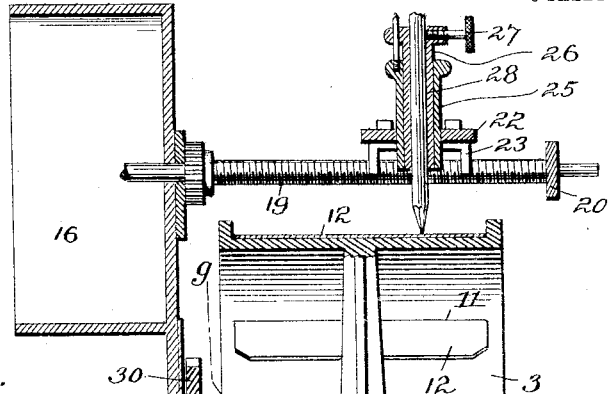
Fig. 6.
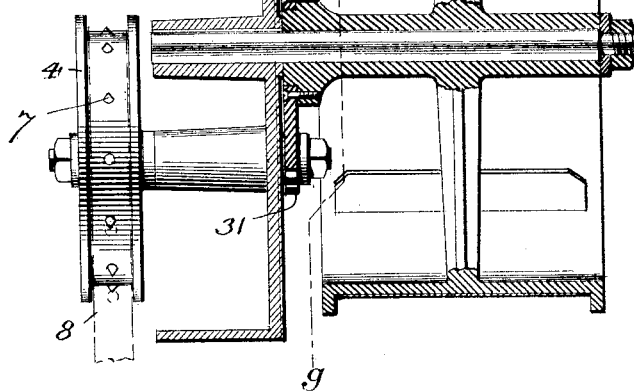
Fig. 7.
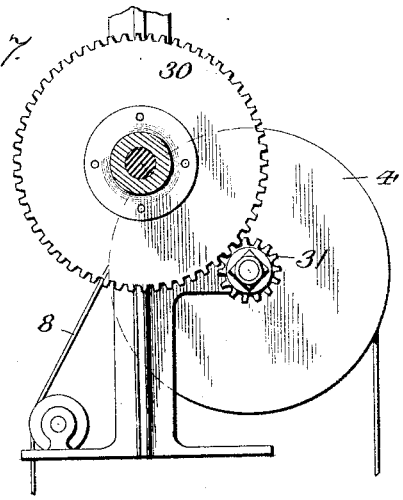
Witnesses:
C. H. Raeder
Fannie Wise
Inventor:
Wendell Hess, Jr.
By Dodge & Sons
Attorneys.

UNITED STATES PATENT OFFICE.

WENDELL HESS, JR., OF TROY, NEW YORK, ASSIGNOR TO W. & L. E. GURLEY, A CORPORATION OF NEW YORK.

RECORDER.

1,105,906.      Specification of Letters Patent.      Patented Aug. 4, 1914.

Application filed May 15, 1912. Serial No. 697,459.

*To all whom it may concern:*

Be it known that I, WENDELL HESS, Jr., a citizen of the United States, residing at Troy, in the county of Rensselaer and State of New York, have invented certain new and useful Improvements in Recorders, of which the following is a specification.

This invention relates to recording devices and particularly to a simple form of mechanism for making a continuous record of water stage or level.

The device belongs to that general class in which a clock driven stylus or pencil marks upon a sheet carried by a drum or similar carrier moved by a float upon the surface of the water, and the novel features are more particularly the form of the supporting drum together with its means for carrying the record paper, and the form of driving mechanism for the pencil carriage.

In the preferred form of the invention, the record of water stage is made full size, and by the particular construction adopted the device may have a very considerable range, recorders capable of measuring variations of level of five feet or more being readily constructed. Heretofore attempts to measure such large fluctuations in their full scale have been attended with considerable difficulty due to the warping or shrinking of the record sheet, with variations in the temperatures and humidity of the air, such variations making it difficult to maintain the record sheet in a smooth condition and resulting in aggregate errors of considerable amount.

One feature of my invention is the subdivision of the record sheet into a number of sections individually held taut. As the normal fluctuation of water stage is commonly from six inches to a foot, it is obvious that the record may ordinarily be confined to one or two such portions of the total record area so that a considerable saving in record sheets and a greater ease of replacement of such sheets are secured. It will be obvious also that with my recorder even where there is a warping or shrinking of the paper, the error so produced will not be cumulative throughout the entire length of an extended record, each individual record sheet having only a slight displacement from its normal position on the record drum, while this drum preserves absolute accuracy in its movements.

A further feature of the invention is the mounting of the pencil carriage upon a pair of clock driven feed screws the carriage being designed merely to rest upon the screws so that all back lash or lost motion is avoided and so that the carriage is guided solely by these screws.

I illustrate the preferred embodiments of my invention in the accompanying drawings, wherein:

Figure 1 is a perspective view of a recording device of the type described, the device illustrated having a range of five feet for one revolution of the recording drum and being capable of recording a period of twenty-four hours' duration; Fig. 2 is a section through the recording drum designed to show the method of supporting the paper and the recording pencil; Fig. 3 is a fragmentary plan view showing the means of driving the feed screws from the clock; Fig. 4 is a partial vertical section on the plane passing through the axis of the recording drum, illustrating the mode of driving the pencil carriage; Fig. 5 is a partial perspective showing the underside of the pencil carriage; Fig. 6 is a vertical section of a modified form of the invention, provided with a reduction gear between the float and the recording drum; and Fig. 7 is a section on the line *g—g* of Fig. 6.

Referring to the drawings, 1 represents a standard or support which may be mounted in any suitable manner, and which is provided with a boss 2 on which is journaled the record drum 3. The face of this drum is divided into two portions or ways by means of three rims 4, 5 and 6. Between the rims 4 and 5, which are relatively close together, are mounted a series of equally spaced studs or pins 7 which engage suitable perforations in the metallic tape 8 connected to the usual float 9 and counterweight 10. The pins 7 may be extensions of the spokes of the drum 3 as shown in Fig. 4.

The portion of the drum between the rims 5 and 6 is designed to receive the recording surface, usually a strip or strips of paper and is provided with a number of slots 11 (in this case ten in number) extending from the rim 5 to the rim 6. The paper record blank consists of a corresponding number of short lengths of paper 12 which are attached to the drum by inserting their ends through the slots 11 and attaching a clamp or clip 13 connected by a radial coil spring 14 to the hub 15 of the record drum. The paper strips 12 fit closely between the rims 5 and 6 and preferably are devoid of any co-ordinate lines or any other graduations, it being my purpose to interpret the records made by this device by means of a measuring board adapted to position the record sheet by means of the creases formed where the paper passes through the slots 11 and to measure the recorded quantities by means of scales fixed to the board, a device of this character being described and claimed in my co-pending application for a patent on improvements in scales, Serial No. 700,477, filed May 29, 1912.

It will be observed that by subdividing and mounting the record sheet as above set forth each section of the surface is held taut, and as the expansion of each portion is relatively slight, practically no error would be introduced thereby. It will be noticed further that the error due to such expansion would not be cumulative in a record extending entirely around the drum as each section of the record is interpreted individually. On the upper end of the standard 1 is mounted a clock movement 16 whose exact form is not material. On the shaft of the hour wheel of this movement is mounted a gear wheel 17 meshing with two equal gears 18 which are consequently driven in the same direction by the gear 17. These gears 18 are fast upon parallel threaded spindles 19, the threads thereof being spaced twelve to the inch. The outer ends of the threaded spindles 19 turn in a plate 20 carried on brackets 21 as is clearly shown in the drawings.

The pencil carriage consists of a plate 22 having downwardly extending lugs 23 with threaded grooves or recesses 24. These fit upon the threaded spindles 19, and consequently, as will be apparent from the drawings, as the clock drives the threaded spindles 19 the pencil carriage will be fed across the record drum in a straight line. The pencil carriage is provided with a vertical tube 25 within which is slidably mounted a tube 26 provided with a clamping screw 27. The clamping screw 27 is for the purpose of binding an ordinary lead pencil 28 inserted through the tube 26 so that the tube 26 serves not only to guide the pencil but also to provide sufficient weight to hold it in marking contact with the record sheet. A slotted bracket 29 carried on the tube 25 straddles the screw 27 and prevents rotary movement of the sleeve 26 which obviously would introduce errors unless the pencil were perfectly sharpened.

In Figs. 6 and 7 I illustrate a device substantially identical to that heretofore described except that the record drum 3 and the clock 16 (the clock not being shown in detail in these figures) are carried on a frame of slightly different form as will be apparent from the drawing. The form of the frame is not however, essential.

The only substantial difference between the modified structure and that shown in the Figs. 1 to 5 is in the use of a pair of reduction gears 30 and 31 between the record drum 3 and the wheel 4 upon which the metallic tape 8 runs. By the use of such reduction gears the diameter of the drum 3 may be considerably decreased without decreasing the total range of the instrument. Its accuracy is however, somewhat less due to the more limited movement for a given variation in stage. The paper record is mounted in the same manner but consists of fewer sections.

In using either of the above recorders the pencil carriage is set at a starting position and the time of starting is marked on the record. As the water stage fluctuates the drum 3 will be rotated and the pencil will then trace a continuous record upon the strips 12 carried by the drum. At the end of the record period other record strips are substituted for those which are removed and the carriage pencil is reset to a new starting point. The record strips may then be mounted in the measuring board heretofore alluded to and may be interpreted by means of suitable scales attached to the board. It is obvious that the scales must be properly correlated to the rates of movement of the parts of the recorder and I contemplate the use of a characteristic measuring board for each type of recorder. While I have mentioned certain dimensions herein these are to be undersood as suggestive merely. Such dimensions of the diameter and width of face of the drum, the pitch of the feed screws and the like are subject to modification to suit individual cases.

Having thus described my invention, what I claim is:

1. The combination of a record drum provided with a plurality of slots extending across its face; holding mechanism carried by said drum and adapted to engage the ends of a plurality of contiguous record strips inserted through said slots, to hold said strips upon the face of said drum; and means adapted to mark a record on said strips.

2. The combination of a record drum provided with a plurality of slots extending across its face; resilient tension devices carried by said drum; clamps carried by said tension device and adapted to engage the ends of record strips inserted through said slots to hold said strips upon said drum; and means adapted to mark a record on said strips.

3. The combination of a record drum;

means for moving said drum proportionally to the movement of a body; a constant speed driving mechanism; a pair of feed screws driven by said mechanism; a carriage removably mounted on said feed screws and guided solely thereby; and a stylus mounted on said carriage and adapted to mark upon a record sheet carried by said drum.

4. The combination of a record drum having slots extending across its face; means for moving said drum proportionally to the movement of a moving body; a series of clamps adapted to engage the ends of record strips inserted through the slots in the record drum; resilient means connected with said clamps to exert stress upon said record strips; a clock movement; a pair of feed screws driven thereby; a stylus carriage driven and guided solely by said feed screws across the face of said drum; and a stylus mounted in said carriage and adapted to mark upon a record sheet carried by the drum.

5. The combination of a suitable supporting frame; a record drum having transverse slots on its periphery; a series of springs within the drum; means for connecting said springs to the ends of record sheets inserted through said slots; a float; connections between the float and the drum whereby the drum is rotated by the movement of the float; a clock; a pair of lead screws driven by said clock and having their axes parallel to the axis of the drum; a carriage resting on said lead screws in engagement with the threads thereof whereby the carriage is both guided and driven by said screws; a guide carried by the carriage; and a pencil mounted in said guide, so as to mark upon a record sheet carried by the drum.

6. The combination of a record drum and a recording stylus coacting therewith, one being movable at constant speed and the other being movable in a direction transverse to the line of movement of the first under the influence of a moving body; and means for supporting on the drum a record blank, comprising a plurality of juxtaposed, unconnected sheets arranged in circumferential order around said drum.

7. The combination of a record drum; means for supporting on the face of said drum a record blank, comprising a plurality of juxtaposed, unconnected sheets arranged in series around the circumference of said drum to form a substantially continuous record receiving surface; and recording means adapted to coact with said drum to record upon the record blank so supported.

In testimony whereof I have signed my name to this specification in the presence of two subscribing witnesses.

WENDELL HESS, Jr.

Witnesses:
C. S. HALLENBECK,
GORDON S. HOPKINS.

Copies of this patent may be obtained for five cents each, by addressing the "Commissioner of Patents, Washington, D. C."